(12) United States Patent
Fiden

(10) Patent No.: US 8,152,623 B2
(45) Date of Patent: Apr. 10, 2012

US008152623B2

(54) WAGERING GAME WITH TWO-WAY CASCADING REEL

(75) Inventor: Daniel P. Fiden, El Granada, CA (US)

(73) Assignee: WMS Gaming Inc., Waukegan, IL (US)

( * ) Notice: Subject to any disclaimer, the term of this patent is extended or adjusted under 35 U.S.C. 154(b) by 1081 days.

(21) Appl. No.: 11/628,486

(22) PCT Filed: Jun. 13, 2005

(86) PCT No.: PCT/US2005/020759
§ 371 (c)(1),
(2), (4) Date: Oct. 1, 2007

(87) PCT Pub. No.: WO2006/009658
PCT Pub. Date: Jan. 26, 2006

(65) Prior Publication Data
US 2008/0051174 A1 Feb. 28, 2008

Related U.S. Application Data

(60) Provisional application No. 60/581,164, filed on Jun. 18, 2004.

(51) Int. Cl.
*A63F 9/24* (2006.01)
*A63F 13/00* (2006.01)

(52) U.S. Cl. ................ 463/20; 463/16; 463/17; 463/18; 463/19

(58) Field of Classification Search ............... 463/16–20
See application file for complete search history.

(56) References Cited

U.S. PATENT DOCUMENTS

| | | | | |
|---|---|---|---|---|
| 4,099,722 | A | 7/1978 | Rodesch et al. | |
| 4,200,291 | A | 4/1980 | Hooker | |
| 4,636,951 | A | 1/1987 | Harlick | 463/25 |
| RE34,244 | E | 5/1993 | Hagiwara | |
| 5,564,700 | A | 10/1996 | Celona | |
| 5,704,835 | A | 1/1998 | Dietz, II | |

(Continued)

FOREIGN PATENT DOCUMENTS

EP 58488 A1 8/1982

(Continued)

OTHER PUBLICATIONS

Tetris Attack Instruction booklet, US release date Sep. 1, 1996, 13 pages.

*Primary Examiner* — Peter DungBa Vo
*Assistant Examiner* — Jasson Yoo
(74) *Attorney, Agent, or Firm* — Nixon Peabody LLP

(57) ABSTRACT

A gaming terminal (1) and a method for playing a wagering game utilizing a two-way cascading symbol feature are disclosed. The wagering terminal has first and second displays, with a first game outcome displayed as a plurality of symbols (14) on the first display (15). The symbols (14) are analyzed to determine if they satisfy a predetermined condition. All symbols satisfying the condition are added to the second display (17). The symbols (16) in the second display (17) then are analyzed for a winning combination. If no winning combination exists, the game is over. A winning combination awards the player credits, before removing the winning symbols from the second display (17). All remaining symbols shift down one position. The symbols (16) in the upper display (17) are analyzed until no more winning combinations exists.

17 Claims, 6 Drawing Sheets

U.S. PATENT DOCUMENTS

| | | | | |
|---|---|---|---|---|
| 5,720,662 | A | 2/1998 | Holmes, Jr. et al. | |
| 5,769,716 | A | 6/1998 | Saffari et al. | |
| 5,807,172 | A | 9/1998 | Piechowiak | |
| 5,951,397 | A | 9/1999 | Dickinson | 463/36 |
| 5,980,384 | A | 11/1999 | Barrie | 463/16 |
| 6,089,977 | A | 7/2000 | Bennett | 463/20 |
| 6,117,013 | A | 9/2000 | Eiba | |
| 6,224,484 | B1 | 5/2001 | Okuda et al. | |
| 6,227,971 | B1 * | 5/2001 | Weiss | 463/20 |
| 6,241,607 | B1 | 6/2001 | Payne et al. | 463/20 |
| 6,251,013 | B1 | 6/2001 | Bennett | 463/13 |
| 6,409,602 | B1 | 6/2002 | Wiltshire et al. | 463/42 |
| 6,419,579 | B1 | 7/2002 | Bennett | 463/20 |
| 6,695,696 | B1 | 2/2004 | Kaminkow | |
| 6,855,054 | B2 | 2/2005 | White et al. | 463/21 |
| 2002/0077165 | A1 | 6/2002 | Bansemer et al. | 463/7 |
| 2003/0008698 | A1 * | 1/2003 | Stone | 463/16 |
| 2003/0027622 | A1 * | 2/2003 | Osawa | 463/20 |
| 2003/0054874 | A1 | 3/2003 | Kaminkow | 463/20 |
| 2003/0057645 | A1 | 3/2003 | Baerlocher | 273/138.2 |
| 2003/0060267 | A1 | 3/2003 | Glavich | 463/20 |
| 2003/0157981 | A1 * | 8/2003 | Marks et al. | 463/20 |
| 2004/0043809 | A1 | 3/2004 | Gomez et al. | 463/16 |

FOREIGN PATENT DOCUMENTS

| | | | |
|---|---|---|---|
| EP | 1 063 622 | | 12/2000 |
| GB | 1 454 046 | | 10/1976 |
| GB | 2 062 922 | | 5/1981 |
| GB | 2 106 293 | A | 9/1981 |
| GB | 2 097 160 | | 10/1982 |
| GB | 2 106 295 | | 4/1983 |
| GB | 2 165 385 | | 4/1986 |
| GB | 2 243 236 | A | 4/1990 |
| GB | 2 372 132 | A | 2/2001 |

* cited by examiner

WAGERING GAME WITH TWO-WAY CASCADING REEL

RELATED APPLICATIONS

This application is a U.S. National Phase of International Application No. PCT/US 2005/020759, filed Jun. 13, 2005, which in turn claims priority from U.S. Provisional Application No. 60/581,164 filed Jun. 18, 2004. Both of these applications are hereby incorporated by reference in their entirety.

FIELD OF THE INVENTION

The present invention relates generally to wagering games and gaming terminals, and more particularly to a two-stage wagering game and a terminal with a two-way a cascading symbol matching feature.

BACKGROUND OF THE INVENTION

Traditional gaming terminals or slot machines have a plurality mechanical reels, which rotate and then stop to show symbols on one or more paylines drawn across the reels. Players wager coins or credits on one or more of these paylines and are paid for certain combinations of symbols randomly displayed on a payline for which a wager has been placed. Video slot machines typically show the same type of reel configuration but only on a video display. Some slot machines award "scatter" pays when a specific symbol(s) appears in any visible position (not necessarily on the payline) on certain reels. One concept that has been successfully employed to enhance the entertainment value of a game is that of a "secondary" or "bonus" game which may be played in conjunction with a "basic" game. The bonus game may comprise any type of game, either similar to or completely different from the basic game, and is activated on the occurrence of a selected event or outcome of the basic game. Such a bonus game produces a significantly higher level of player excitement than the basic game because it provides a greater expectation of winning than the basic game alone.

Another concept that has been employed in wagering games to add player excitement is a symbol shifting feature. For example, some slot machines use a "nudge" feature (e.g. "Double Diamond Deluxe" by IGT) after the results of the game are displayed. Such a feature allows certain symbols to rise to the payline when they appear below the payline, or other symbols will fall to the payline when they appear above the payline. Similarly, some games allow the player to "nudge" certain symbols after the result of the game is displayed in an to attempt to modify the original result and achieve a better result Another wagering game using a symbol shifting feature is disclosed in U.S. Patent Publication No. 2004/0033829 entitled Symbol Matching Gaming Machine, which is commonly owned by the assignee of the present application. In one embodiment, a screen displays a matrix of randomly generated game symbols, which are from a predefined set of symbols. In order to receive credits, a winning combination of symbols must exist. Winning symbol combinations are created by interchanging the positions of symbols. When a winning combination of symbols is formed, the player is awarded credits, the winning combination symbols are removed, and all of the symbols above the removed symbols cascade down to fill in the empty spaces. The empty spaces created by the removal of symbols forming a winning combination are filled by adding additional randomly generated symbols.

Still yet another game utilizing a symbol shifting feature is described in U.S. Patent Publication No. 2004/0043809 entitled "Chain Reaction Game" and is commonly owned by the assignee of the present application. In one embodiment, a screen displays a matrix of randomly generated game symbols. Once displayed, the symbols are analyzed to determine if any winning combinations of symbols exist. If a winning combination(s) exists, the player is awarded the number of credits corresponding to the combination, and the winning combination of symbols is removed. Once the winning combination is removed, the symbols in the column above each symbol forming a part of the winning combination move down to fill in the empty spaces in the matrix. The symbols are again analyzed to determine if any winning combinations exist. In no winning combination exists, the game is over. If a winning combination exists, the game continues as previously discussed until no further winning combinations are created at which time the game is over.

Due to player appeal, gaming terminals having shifting symbol features are common. Accordingly, in the competitive gaming machine industry, there is a continuing need for gaming machine manufacturers to produce new types of games, or improvements to existing games using shifting symbol features, which will attract frequent play by enhancing the entertainment value and excitement associated with the game. Preferably, such new features will maintain, or even further enhance, the level of player excitement. The present invention is directed to satisfying these needs.

SUMMARY OF THE INVENTION

A first aspect of the present invention relates to a method of playing a wagering game on a gaming terminal, which has a first display location and a second display location. The second display location may include at least one symbol satisfying a predefined condition. Initially, a player places a wager and activates the gaming terminal. Once activated, a first game outcome comprising first game symbols randomly is generated and displayed at the first location. The first game symbols are analyzed to determine if any of the symbols satisfy the predefined condition. If none of the symbols satisfy the predefined condition the game is over. If one (or more) first game symbol satisfies the condition, the symbol(s) is then displayed in the second location. The first game symbols and the at least one other symbol satisfying the predefined condition displayed in the second location form the second game outcome. The second game outcome then is analyzed to determine if a winning combination exists. The game is over if no winning combination exists. Alternatively, if a winning combination exists in the second location, the player is awarded credits, and the second game outcome symbols forming the winning combination are removed from the second location. Any remaining second game outcome symbols are then moved to a new position in the second location. After the second game outcome symbols are moved to a new location, they again are analyzed to determine if a winning combination exists. If another winning combination of second game outcome symbols exists, the player is again awarded credits, and the game continues as discussed above until there are no more winning combinations of symbols in the second location.

A second aspect of this invention relates to a gaming terminal for playing the wagering game of the present invention. The gaming terminal comprises first and second displays and a processor having the capability of randomly selecting a plurality of symbols from a preselected symbol set. The gaming terminal further may comprise a memory including a preselected symbol set, at least one predefined condition, and a plurality of winning symbol combinations. The gaming terminal further has a first set of randomly selected symbols displayed on the first display and a second set of symbols displayed on said second display. The second set of symbols comprises any first set symbols satisfying the predefined combination. The processor analyzes whether any second set symbols in the second location form a winning combination, removes any second set symbols forming a winning combination, and moves any remaining second set symbols for a new position in said second location.

The above summary of the present invention is not intended to represent each embodiment, or every aspect, of the present invention. Additional features and benefits of the present invention are apparent from the detailed description, figures, and claims set forth below.

Figure 1:
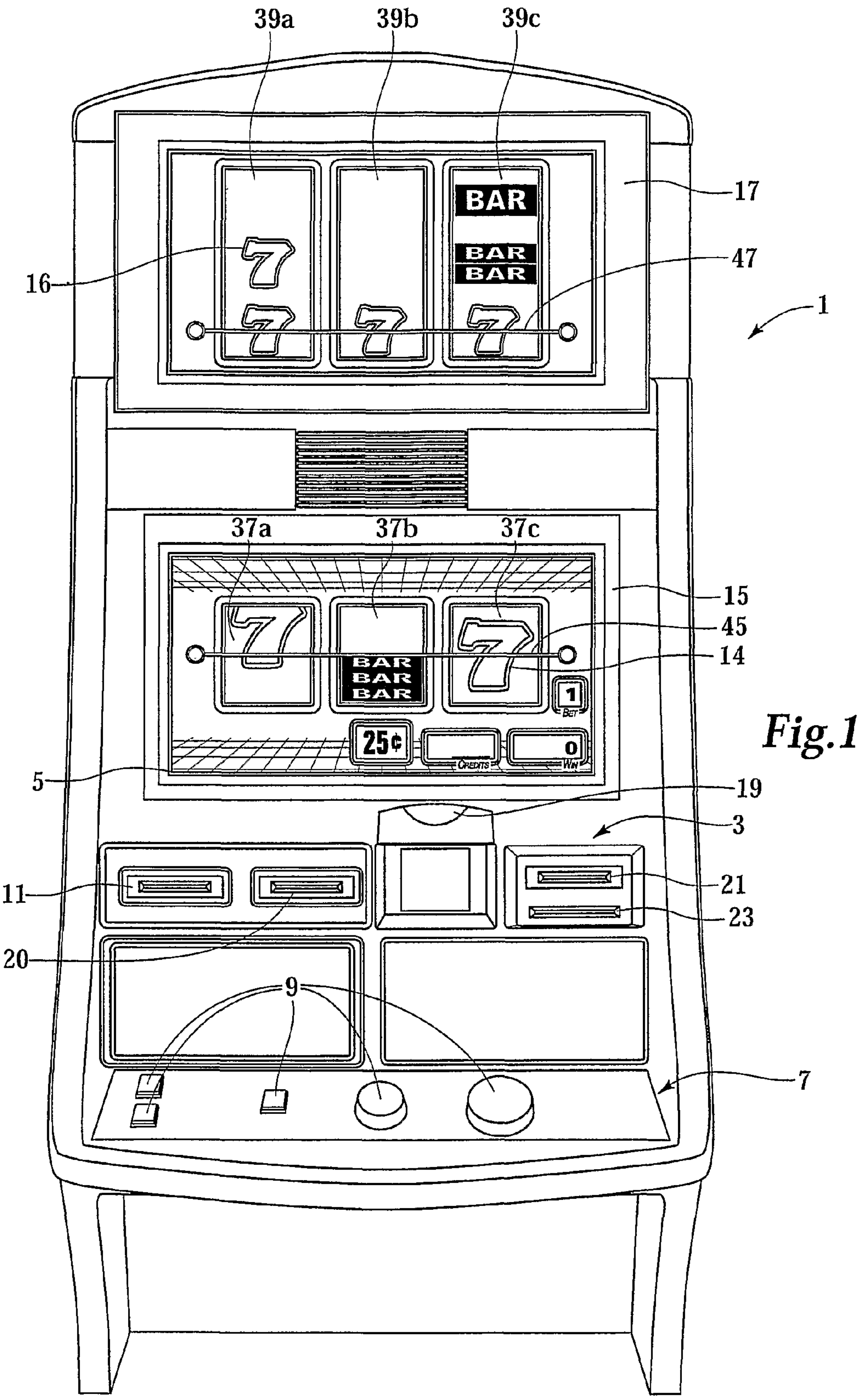
FIG. 1 is a front elevational view of a gaming terminal of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

FIG. 1 shows a front elevational view of a typical gaming terminal 1 used by gaming establishments, such as casinos. With regard to the present invention, the gaming terminal 1 may be of any type and may have varying structures and methods of operation. For example, the gaming terminal 1 may be a mechanical gaming terminal configured to play mechanical slots, or it may be an electromechanical or electronic gaming terminal configured to play a video casino game, such as blackjack, slots, keno, poker, etc.

Figure 2:
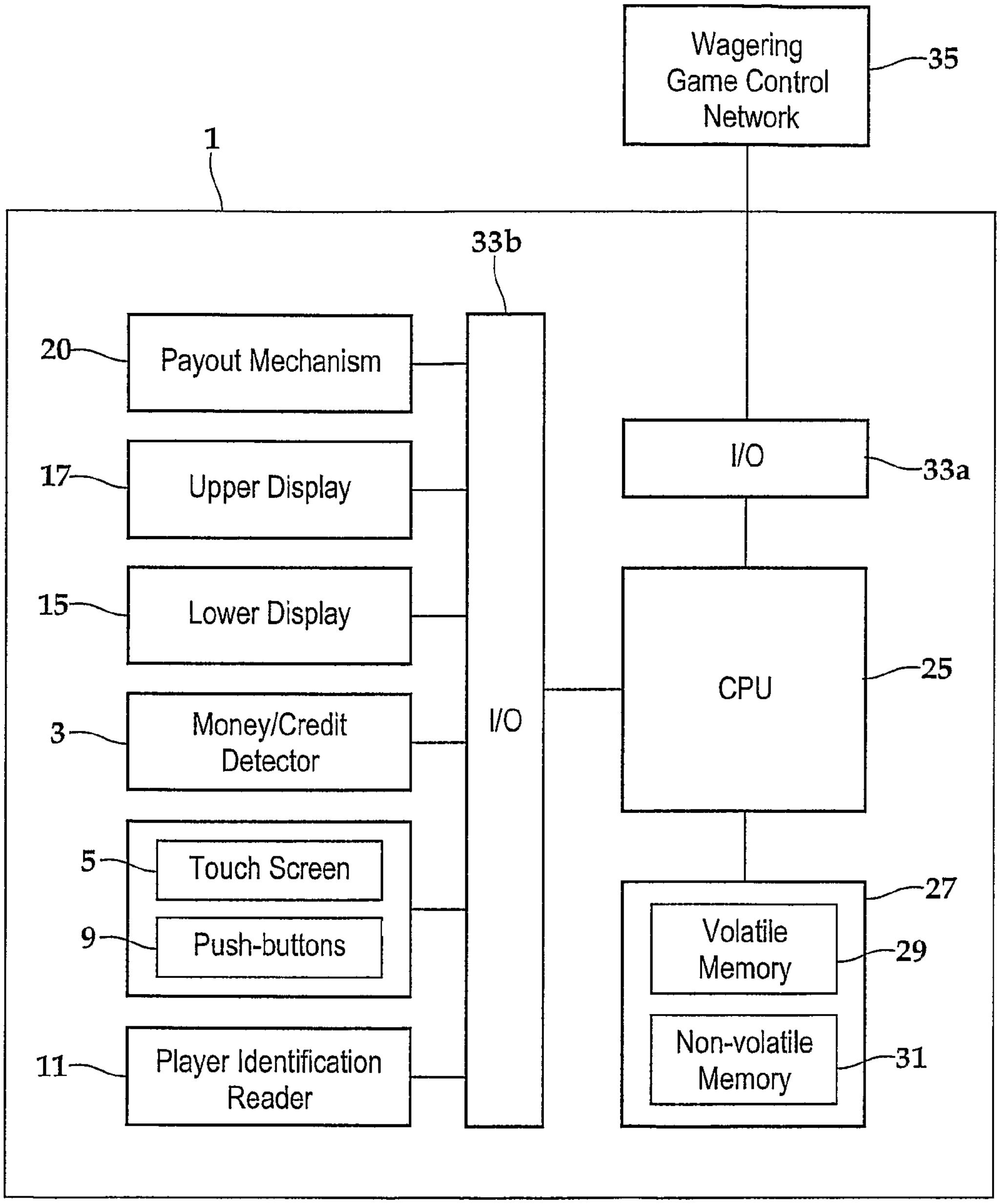
FIG. 2 is a block diagram of a gaming terminal of the present invention.

As further shown in FIGS. 1 and 2, the gaming terminal 1 includes input devices, such as a wager acceptor 3, a touch screen 5, a push-button panel 7, including buttons 9, a player-identification card reader 11, and optionally, an arm to pull (not shown). For outputs, the gaming terminal 1 includes a lower display 15 for displaying information about a first game outcome, and an upper display 17 for displaying information about a second game outcome. A payout mechanism 20 also is provided for dispensing receipts to players who have "cashed-out" their remaining credits. The receipt can be taken to a cashier and exchanged for the amount shown on the receipt. In addition or alternatively, the gaming terminal may have payout mechanisms for dispensing coins or notes (not shown) to players who have "cashed-out."

The gaming terminal 1 also may include a progressive game display (not shown) generally on a top portion of the terminal 1 for displaying the value of a progressive game. The gaming terminal 1 also may include a paytable (not shown) on the face the terminal 1 illustrating the different positive or winning combinations of symbols and the credits awarded when a winning combination is displayed. Alternatively, the paytable may be stored in the computer memory of the gaming terminal 1 and displayed by pushing a button 9 on the push-button panel 7 or touching a specified location on the touch screen 5. While these typical components found in the gaming terminal 1 are described below, it should be understood that numerous other elements may exist and may be used in any number of combinations to create various forms of a gaming terminal.

The wager acceptor 3 may be provided in many forms, individually or in combination. For example, the wager acceptor 3 may accept cash and may include a coin slot acceptor 19 and/or a note acceptor 21 to input value to the gaming terminal 1. In addition, the wager acceptor 3 may include a card-reading device 23 for reading a card that has a recorded monetary value with which it is associated. The card reading device 23 may also receive a card that authorizes access to a central account, which can transfer money to the gaming terminal 1.

The push button panel 7 is typically offered, in addition to the touch screen 5 which overlies the lower display 15 (or a portion thereof), to provide players with an option on how to make their game selections. Alternatively, the push button panel 7 provides inputs for one aspect of operating the game, while the touch screen 5 allows for inputs needed for another aspect of operating the game.

The first game outcome of the wagering game is displayed to the player on the lower display 15 in the form of symbols 14 centered about a payline 45. The lower display 15 may take the form of a cathode ray tube (CRT), a high resolution LCD, a plasma display, LED, or any other type of video display suitable for use in the gaming terminal 1. Alternatively, mechanical reels, well known in the art, may be used to show the first game outcome on the lower display 15.

The second game outcome is displayed to the player on the upper display 17 in the form of upper display symbols 16 centered about an upper payline 47. Similar to the main display, the secondary display may take the form of a cathode ray tube (CRT), a high resolution LCD, a plasma display, LED, or any other type of video display suitable for use in the gaming terminal 1. In one embodiment of the present invention, the lower display 15 is a mechanical reel display and the upper display 17 is video display. Alternatively, both the lower display 15 and the upper display 17 may be electronic displays such as video screens.

The player-identification card reader 11 allows for the identification of a player by reading a card with information indicating his or her true identity. Currently, the identification is used by casinos for rewarding certain players with complimentary services or special offers. For example, a player may be enrolled in a gaming establishment's players' club and may be awarded certain complimentary services as that player collects points in his or her player-tracking account. The player inserts his or her card into the player-identification card reader 11, which allows the casino's computers to register that player's wagering at the gaming terminal 1.

As shown in FIG. 2, the various components of the gaming terminal 1 are controlled by a central processing unit (CPU) 25 (such as a microprocessor or microcontroller). To provide the gaming functions, the CPU 25 executes a game program that allows for the randomly selected first game outcome. The CPU 25 is also coupled to or includes a system memory 27. The system memory 27 may comprise a volatile memory 29 (e.g., a random-access memory (RAM)) and a non-volatile memory 31 (e.g., an EEPROM). It should be appreciated that the CPU 25 may include one or more microprocessors. Similarly, the system memory 27 may include multiple RAM and multiple program memories.

Communications between the peripheral components of the gaming terminal 1 and the CPU 25 occur through input/output (I/O) circuits 33*a-b*. As such, the CPU 25 also controls and receives inputs from the peripheral components of the gaming terminal 1. Further, the CPU 25 communicates with external systems via the I/O circuits 33*b* Although the I/O circuits 33*a-b* may be shown as a single block, it should be appreciated that the I/O circuits 33*a-b* may include a number of different types of I/O circuits.

In some embodiments, the CPU 25 may not be inside the gaming terminal 1. Instead, the CPU 25 may be part of a game network 35 (FIG. 2) and may be used to control numerous gaming terminals 1. In these embodiments, the CPU 25 will run the basic games for each of the gaming terminals 1, and may also be used to link the gaming terminals 1 together. The game network 35 can include progressive jackpots that are contributed to by all or some of the gaming terminals 1 in the network (e.g., terminal-level jackpots that only each terminal 1 contributes to, bank-level jackpots that are contributed to by all of the terminals 1 in a particular bank, and wide-area jackpots that are contributed to by a larger number of terminals 1, such as multiple banks).

The game control network 35 also may include a network that controls the play of restricted-access progressive wagering games, as described in U.S. Patent Application No. 60/502,762, filed on Sep. 12, 2003, and entitled "Restricted Access Progressive Game For A Gaming Machine," which is commonly owned and herein incorporated by reference in its entirety. The gaming terminal 1 often has multiple serial ports, each port dedicated to providing data to a specific host computer system that performs a specific function (e.g., accounting, player-tracking, or a progressive game control system, etc). To set up a typical serial communication hardware link to the host system, the typical RS-232 point-to-point communication protocol that is often present in the gaming terminal 1 is converted to an RS-485 (or RS-485-type) master-slave protocol so as to take advantage of some of the advantages of the RS-485 capability (e.g., multi-drop capability that allows many gaming terminals 1 to communicate with the game control network 35). To perform this function, a custom interface board may be used by the gaming terminal 1 for each communication port in the gaming terminal 1. It should be noted that the gaming terminal 1 can initially be designed to be configured for a typical RS-485 protocol, instead of the typical RS-232 protocol. Further, the gaming terminal 1 may simply be designed for an Ethernet connection.

Figure 3:
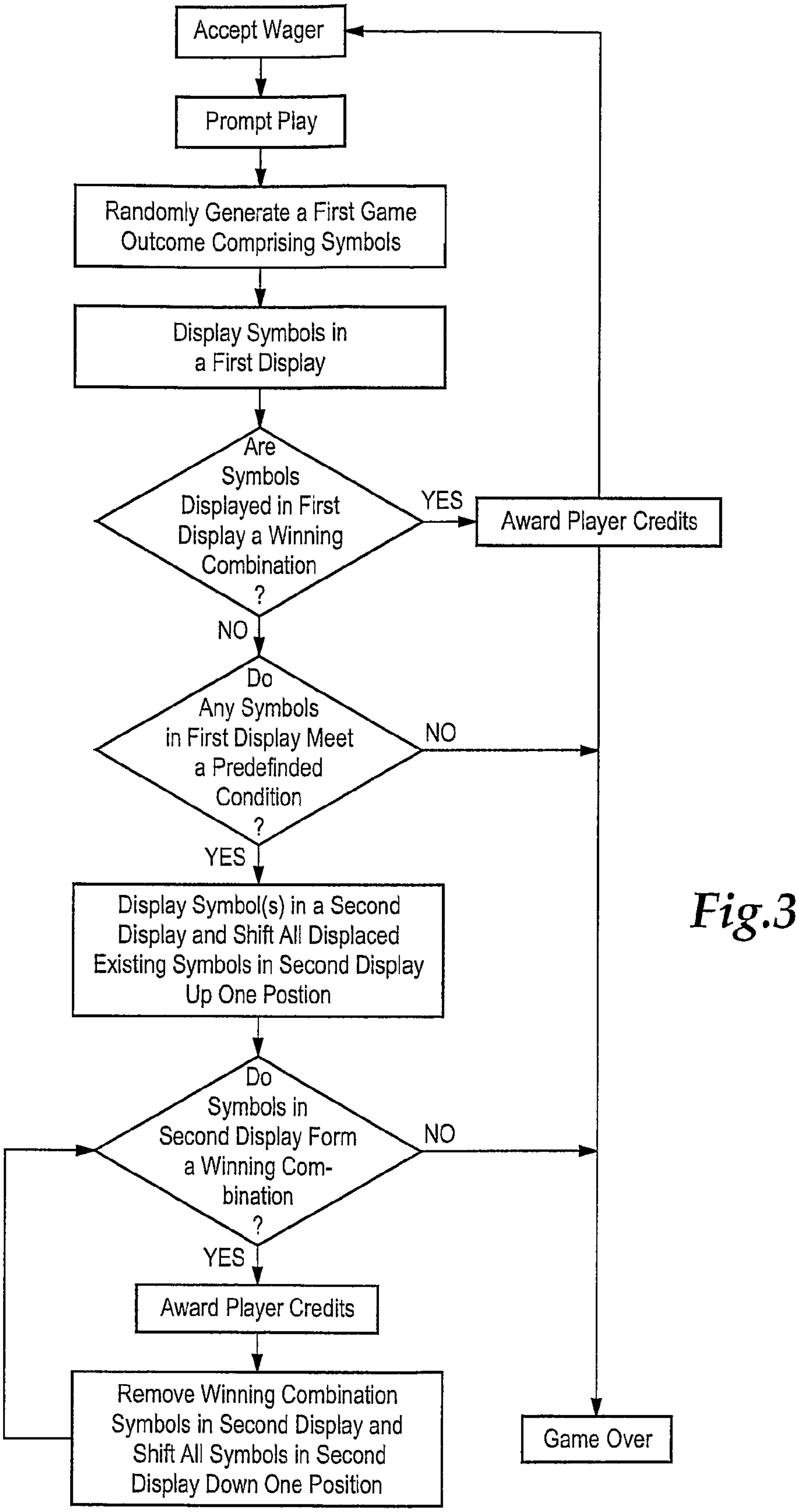
FIG. 3 is a flow chart for one embodiment of the wagering game of the present invention.

The operation of one embodiment of the wagering game of the present invention now is discussed with respect to FIGS. 1 and 3. Initially, a player inserts a wager and the gaming terminal 1 accepts the wager. Once the wager is accepted, the gaming terminal 1 prompts the player to start the game by pushing a button 9 on the button panel 7, pulling down on the arm (not shown), or touching a key on the touch screen 5. Subsequently, a randomly generated first game outcome is displayed in the form of symbols 14 on the first lower display 15. The first game outcome is then analyzed to determine if any of the symbols meet a predefined condition. If one or more first game outcome symbols satisfies the predefined condition, then the symbol is added to the second upper display. The symbols 16 in the second display are then analyzed to determine if a winning combination exists.

For example in one embodiment, if the symbols 14 form a winning combination according to the paytable (not shown), the player is awarded the corresponding number of credits, and the game is over unless the player places another wager. If the symbols 14 shown on the lower display 15 do not form a winning combination, the CPU 25 then analyzes whether any of the symbols 14 satisfy a predetermined condition. If none of the symbols 14 satisfy the predetermined condition, the game is over unless the player places another wager. On the other hand, if one or more of the symbols 14 satisfy the predetermined condition, the symbol(s) 14 is added to the upper display 17.

In one embodiment, the predetermined condition is a symbol 14 centered on the payline 45 in the lower display 15. Alternatively, the predetermined condition may be a symbol 14 centered above or below the payline 45. In yet another embodiment, the predetermined condition may be that a symbol is selected from the first game outcome after a predetermined number of "spins" or plays on the gaming terminal 1. For example, if the first game outcome is displayed as symbols on three reels, a symbol from the left reel may be added to the upper display 17 after 3 plays; a symbol from the middle reel then may be added after an additional three plays; and a symbol from the right reel may be added three plays thereafter. Those skilled in the art will appreciate that any number of different predetermined conditions may be used in order to select which symbols 14 will be added to the upper display 17. Furthermore, in one embodiment, the symbol(s) 14 is added to the upper display 17 so that it is centered on the payline 47 and in an upper window 39 directly above a lower window 37 in the lower display 15 in which the symbol appeared. When the symbol(s) 14 is added to the upper display 17 in this manner, any displaced symbols 16 in that window are moved up one position. Alternatively, the symbol(s) 14 which satisfy the predetermined condition may be added at the top of or randomly placed at any position in the upper display 17.

Thereafter, the CPU 25 analyzes whether the symbols 16 centered on the payline 47 in the upper display 17 of one embodiment form a winning combination according to the same paytable (not shown) used to determine if the first game outcome forms a winning combination. Alternatively, a second paytable (not shown) may be used to determine if the symbols 16 in the upper display form a winning combination. If no winning combination is formed, the game is over unless the player places another wager. However, if a winning combination of symbols 16 is centered on the payline 47 of the upper display 17, the player is awarded the number of credits corresponding to that combination on the paytable (not shown). Once the player is awarded the credits, the symbols 16 forming the winning combination are removed from the upper display 17, and all remaining symbols 16 in the upper display above the winning symbols shift or cascade downward one position. After all of the symbols 16 in the upper display 17 have moved down one position, the CPU 25 analyzes whether a new winning combination has been formed on the payline 47 of the upper display 17. This sequence continues until there are no more winning combinations in the upper display 17. The game is then over unless the player places another wager.

Figure 4:
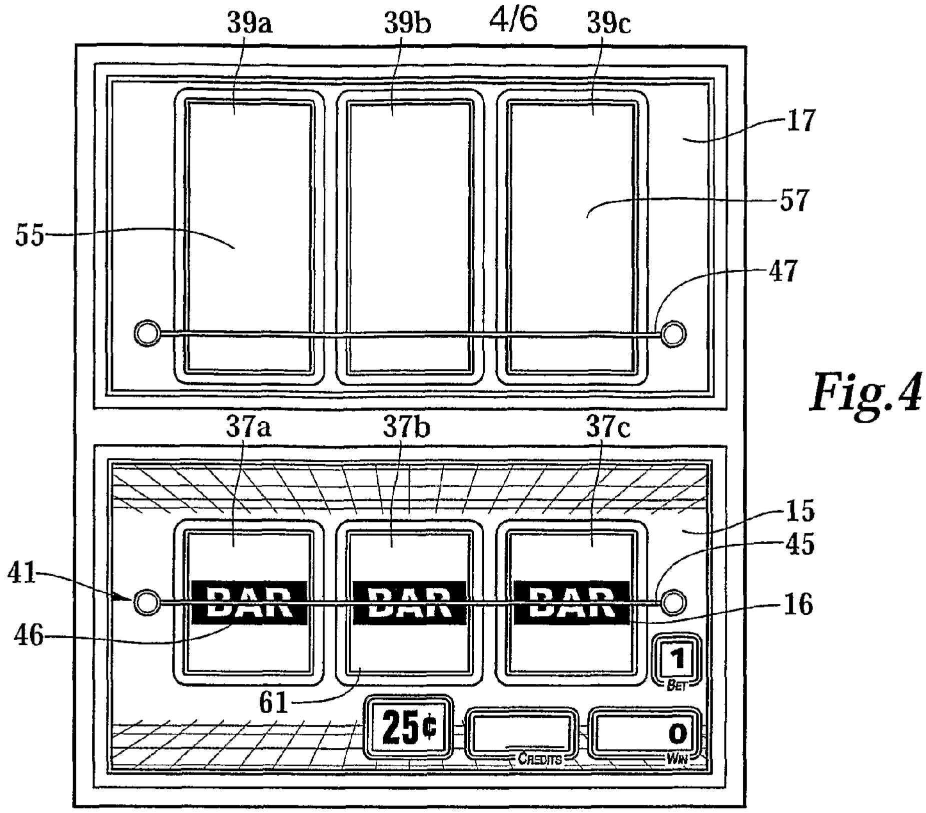
FIGS. 4-8 are various displays of one embodiment of the wagering game of the present invention.

Referring now to FIG. 4, an enlarged front elevational view of the lower display 15 and the upper display 17 of the gaming terminal 1 are shown. Both the lower display 15 and the upper display 17 have three windows 37*a-c* and 39*a-c* and display at least one row 41 of symbols. If mechanical reels are used in either the lower 15 and/or upper display 17, windows 37 and 39 allow the player to view reels which are located inside the gaming terminal 1. Alternatively, if electronic displays are used, windows 37 and 39 are the electronic reels. The payline

45 passes through the center of the lower display windows 37*a-c* while an upper display payline 47 passes through the bottom portion of the upper display windows 39*a-c*. Those skilled in the art readily will understand that the gaming terminal may have more or less than three windows in the upper and lower displays and more than one payline positioned at any location on the upper and lower display windows. Similarly, those skilled in the art will understand that any type of symbols well known in the art may be used in the wagering gaming of the present invention.

As shown in FIG. 4, a first wager has been placed and the CPU 25 randomly has generated a first game outcome which is shown on the lower display 15 as three single bar symbols 46 centered on the payline 15. According to the paytable, the combination of three single bar symbols 46 centered on the payline indicates that the player has won a specific number of credits. Because the combination is a winning combination and credits are given to the player, none of the single bar symbols 46 from the lower display 15 are added to the upper display 17. The game is over unless another wager is placed.

Figure 5:
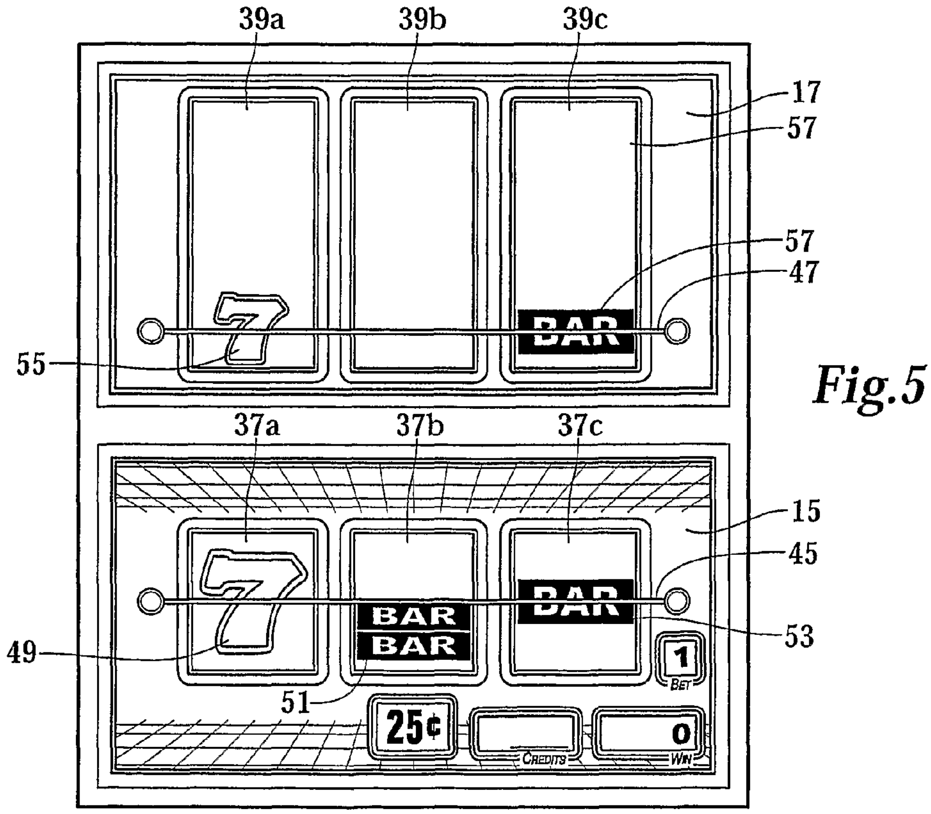

FIG. 5 shows additional enlarged front elevational views of the same lower display 15 and the upper display 17 after a second wager has been placed and the gaming terminal 1 has been activated. As shown in the lower display 15, the CPU 25 randomly has generated another first game outcome displayed as a seven 49 centered on the payline 45, a double bar 51 centered below the payline 45, and a single bar 53 centered on the payline 45. According to the paytable (not shown), this combination of symbols shown in FIG. 5 is not a winning combination. Although the combination is not a winning one, the seven 49 and the single bar 53, both centered on the payline 45, are added to the upper display 17. In particular, as shown in FIG. 5, the seven 49 and single bar 53 are added to the windows 39*a* and 39*c* respectively in the upper display 17 directly above the corresponding windows 37*a* and 37*b* in the lower display 15 and centered on the upper display payline 47. These symbols, seven 55 and single bar 57, centered on the upper display payline 47 form the second game outcome. The CPU 25 then analyzes the symbols in the second game outcome to determine whether a winning combination of symbols exists. According to the paytable (not shown) in this embodiment, there must be at least three symbols centered on the payline for a winning combination. Therefore, at this point, the game is over, and the player must place another wager in order to continue playing.

Figure 6:
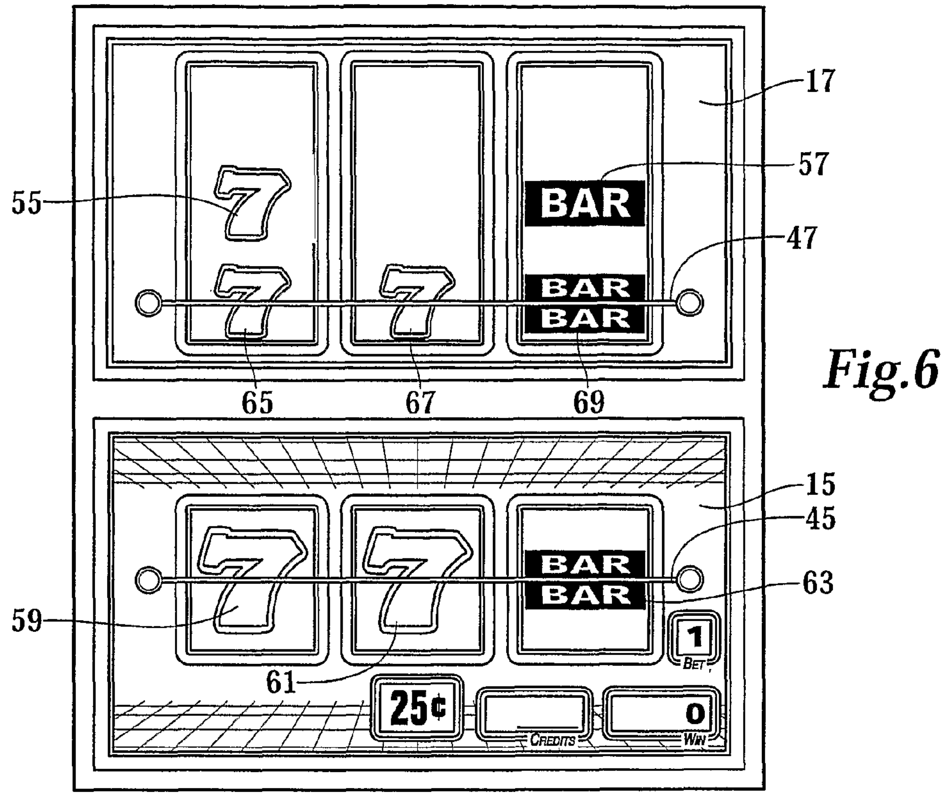

Referring now to FIG. 6, the player has placed a third wager and activated the gaming machine. The CPU 25 has randomly generated another first game outcome, which is displayed in the lower display 15 as two sevens 59 and 61 and a double bar 63 centered on the payline 45. According to the paytable (not shown), this combination of two sevens 59 and 61 and a double bar 63 is not a winning combination. Therefore, the player is not awarded any credits. However, because the two sevens 59 and 61 and the double bar 63 all are centered on the lower display payline 45 each of these symbols is added to the upper display 17 and centered on payline 47 as shown in FIG. 6. The seven 55 and the single bar 57 displayed on the upper display 17 as a result of the player's second wager are shifted up one row in the upper display 17. At this point, the game is over because the two sevens 65 and 67 and the double bar 69 centered on the upper display payline 47 do not form a winning combination, and the player must place another wager in order to continue playing.

Figure 7:
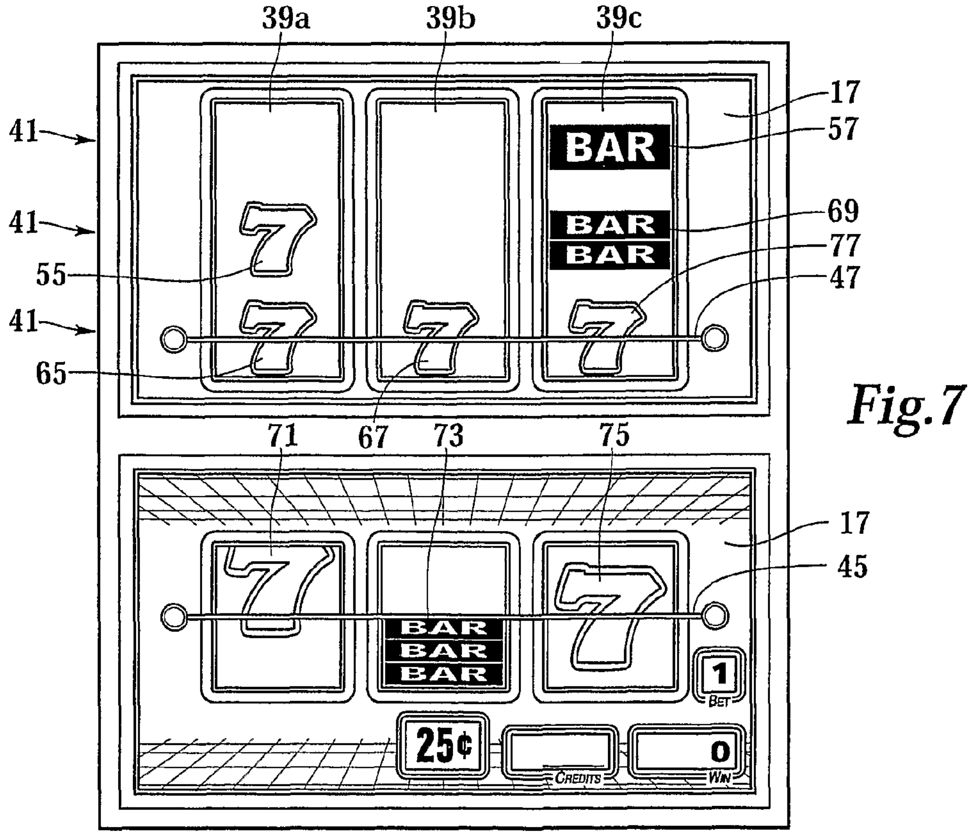

Referring now to FIG. 7, the player has placed a fourth wager and activated the gaming machine. The CPU 25 randomly generates another first game outcome, which is displayed in the lower display 15. In particular, the first game outcome is displayed as a seven 71 centered above the payline 45, a triple bar 73 centered below the payline 45, and a seven 75 centered on the payline 45. According to the paytable (not shown), the combination shown in the lower display 15 in FIG. 7 cannot be a winning combination because the seven 71 and the triple bar 45 are not centered on the payline 45. However, because the seven 75 is centered on the payline, it is displayed on the upper display 17 centered on the payline 47. When the seven 75 is added to upper display 17, the single bar 57 and the double bar 69 are shifted up one row. The resulting second game outcome in FIG. 7 is three sevens 65, 67, 77 centered on the upper display payline 47. The CPU 25 then analyzes the symbols centered on the payline 47 in the upper display 17 to determine whether a winning combination exists. According to the paytable (not shown) three sevens form a winning combination, and the player is awarded the number of credits corresponding to this combination shown in the paytable. Once the player has received his or her credits, the wining combination of three sevens 65, 67, and 77 is removed from the upper display 17 and each symbol in the upper display 17 shifts or cascades down one position as shown in the upper display 17 in FIG. 8.

Figure 8:
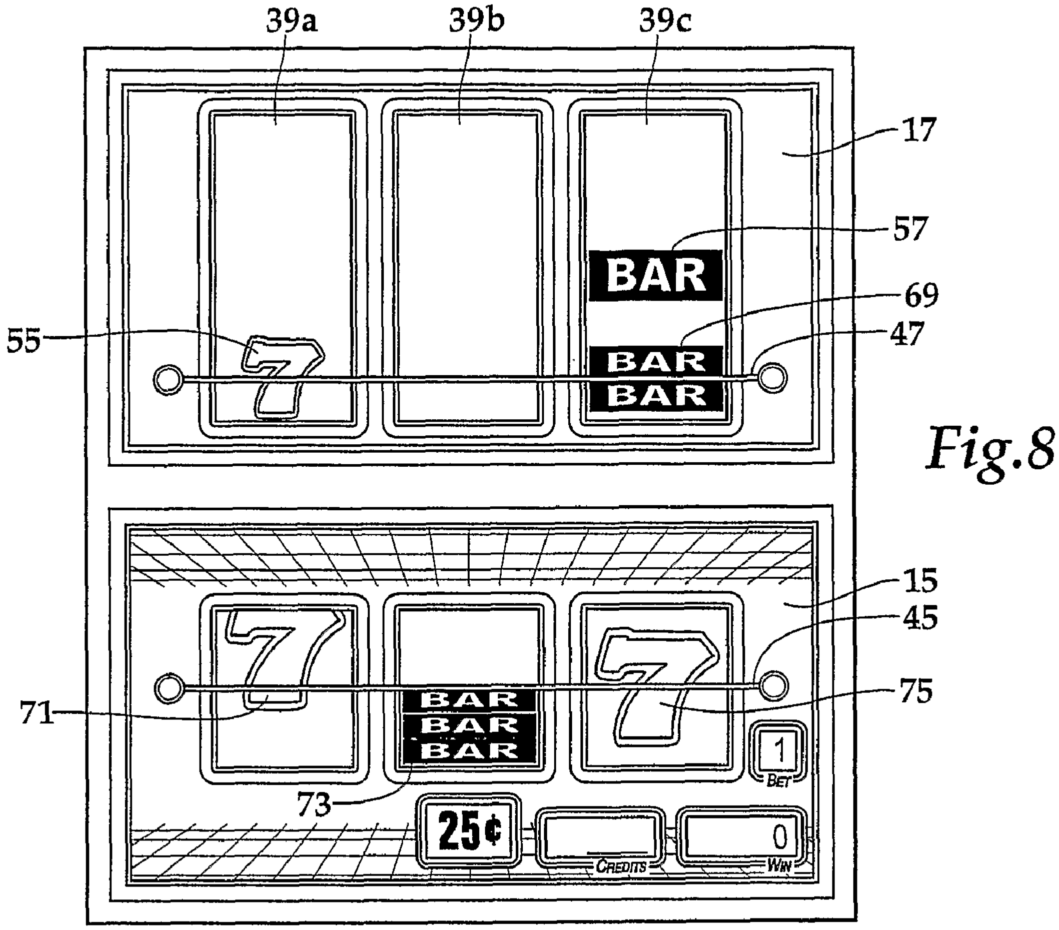

Subsequently, the CPU 25 again analyzes the new symbols centered on the payline 47 in the upper display 17 to determine if the combination is a winning combination. As shown in FIG. 8, the seven 55 and the double bar 69 are centered on the payline 47 in the upper display, but there is no symbol in the center window 39*b*. According to the paytable (not shown) this combination is not a winning combination; therefore, the game is over. However, if the combination had been a winning combination, the player would have been awarded the number of credits associated with the particular combination, and the game would proceed as previously discussed with respect to a winning combination in the upper display 17. Once there are no winning combinations centered on the upper display payline 47, the game is then over.

As further shown in FIG. 7, the player can see three rows of symbols 16 on the upper display 17. However, the size of the upper display windows 39*a-c* may be increased or decreased to display a greater or fewer number of rows of symbols to the player. In addition, the CPU 25 may store a predetermined number of symbols that have been added to the upper display 17 as a result of play on the gaming terminal 1. Once gaming terminal 1 has been operated for a sufficient time to reach a predetermined number of symbols 16 stored in the memory 27, the oldest symbols will be deleted from the memory 27 to make memory available for new symbols to be added. Those skilled in the art will understand that any number of symbols may be stored in the memory 27 before older symbols are removed.

In another embodiment of the wagering game of the present invention, a "demolition" symbol may be incorporated into the symbols that are used to play the game. The demolition symbol can be used to clear all or some of the symbols shown on the upper display. For example, if three seven demolition symbols randomly are generated by the CPU and appear centered on the payline in the lower display, all of the symbols in the upper display will disappear. Alternatively, if a single bar demolition symbol appears centered on the payline of the lower display, all of the single bar symbols in the upper display will be cleared, and any symbols above the cleared single bar symbols would shift or cascade down one or more positions in the upper display. In yet another embodiment, all symbols in the upper display are cleared when a demolition symbol appears in the lower display and is added to the upper display as a result of not forming part of a winning combination and being centered on the lower display payline. Those skilled in the art will recognize that any number of combinations of demolition symbols in the lower display may clear any number of combinations of symbols in the upper display. Furthermore, it may be desirable to remove all symbols from the upper display and the memory after a certain period of time has elapsed or an event has occurred. For example, if the gaming terminal has not been played for a period of time, the symbols in the upper display and memory may be cleared. Alternatively, the symbols in the upper display and memory may be cleared when the gaming terminal recognizes that a new player has begun using the terminal by reading a new player identification card or player wager card.

In still yet another embodiment of the wagering game of the present invention, a wild card symbol can be used to increase player excitement. For example, if a "wild" symbol appears centered on the payline in the lower display and is not part of a winning combination, then the "wild" symbol will be shifted up into the upper display. The "wild" symbol may be any symbol and can be used to create a winning combination when it is centered on the payline in the upper display.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A method of playing a wagering game on a gaming terminal comprising:

(a) providing a gaming terminal having a first display location and a second display location, said second display location capable of displaying symbols from said first display location;

(b) displaying in said first location a first game outcome comprising a plurality of randomly generated first game symbols, wherein each of the plurality of first game symbols is either in a position that is intersected by a payline within the first display location or in a position that is not intersected by said payline;

(c) determining, by at least one of one or more processors, if said first game outcome is a winning combination, and awarding credits to a player if said first game outcome is a winning combination;

(d) if said first game outcome is not a winning combination, analyzing said first game symbols to determine if any first game symbol satisfies a predefined condition, the predefined condition including at least one non-winning game symbol in a position that is intersected by the payline of the first display location;

(e) displaying any first game symbol in the position intersected by the payline satisfying said predefined condition in said second display location, said first game symbols displayed in said second location comprising second game outcome symbols;

(f) analyzing, by at least one processor of the one or more processors, said second game outcome symbols to determine if a winning combination exists;

(g) removing any second game outcome symbols forming a winning combination from said second display location;

(h) moving any second game outcome symbols remaining in said second display location to a new position in said second location; and (i) repeating steps (d)-(h) until no winning combinations are formed in said second display location.

2. The method of claim 1, wherein said second game outcome symbols in said second location are displayed in a matrix comprising an upper, a middle, and a lower row.

3. The method of claim 2, wherein any first game symbol displayed in said first location in the predetermined position subsequently is displayed initially in said lower row in said second display location.

4. The method of claim 2, further comprising moving a second game outcome symbol in the second location from a lower row position to a middle row position when said any first game symbol is added to said lower row position occupied by said second game outcome symbol, and wherein said second game outcome symbols in said lower row are analyzed for a winning combination.

5. The method of claim 4, further comprising moving the remaining second game outcome symbols in said second location down one row when said winning second game symbols are removed from said lower row.

6. The method of claim 1, wherein said second display location has at least one payline.

7. A gaming terminal for playing a wagering game comprising;

a processor capable of randomly selecting a plurality of symbols from a predefined symbol set in response to receiving a wager input from a player;

a plurality of winning symbol combinations and at least one predefined condition stored in said processor;

a randomly selected first set of symbols displayed on a first display, said first set of symbols each comprising either a winning or non-winning combination, wherein each of the first set of symbols is either in a position that is intersected by a payline within the first display or in a position that is not intersected by the payline;

a second set of symbols comprising said first set of symbols not part of a winning combination and satisfying said predefined condition, said predefined condition including a non-winning symbol in a position intersected by the payline of the first display; and second display displaying said second set of symbols; wherein said processor: (1) analyzes whether any second set symbols displayed in said second location are a winning combination; (2) removes any second set symbols forming a winning combination from said second location; and (3) moves any remaining second set symbols to a new position in said second location.

8. The gaming terminal of claim 7, wherein said first display is at least one mechanical reel.

9. The gaming terminal of claim 7, wherein said second display is a video screen.

10. The gaming terminal of claim 9, wherein said first display is a video screen.

11. The gaming terminal of claim 7, wherein said second set of symbols further comprises a plurality of first game symbols satisfying said predefined condition.

12. The gaming terminal of claim 7 further comprising a memory coupled to said processor, wherein said second set of symbols are stored in said processor memory.

13. The gaming terminal of claim 12, wherein at least one second set symbol is removed from said processor memory after a predetermined number of symbols are stored in said memory.

14. A method of playing a wagering game on a gaming terminal comprising:

(a) providing a gaming terminal having a first display location and a second display location;

(b) displaying, in said first display location, a plurality of symbols indicative of a randomly selected game outcome, wherein each of the plurality of symbols is either in a position that is intersected by a payline within the first display location or in a position that is not intersected by the payline;

(c) determining, by at least one of one or more processors, whether said plurality of symbols satisfy a predefined condition, said predefined condition including at least one non-winning symbol in a position that is intersected by of the payline of the first display location;

(d) in response to one or more of said plurality of symbols satisfying said predefined condition, adding said one or more of said plurality of symbols to other symbols in said second display location; and (e) after said adding, providing a payout to the player if said other symbols and said added one or more of said plurality of symbols in said second display location provide a winning combination of symbols.

15. The method of claim 14, wherein said other symbols in said second display location are from adding symbols from said first display location from previous plays of the wagering game.

16. The method of claim 14, wherein said adding comprises displacing one of said other symbols with one or more of said plurality of symbols.

17. The method of claim 14, wherein said second display location comprises at least one payline.

* * * * *

UNITED STATES PATENT AND TRADEMARK OFFICE

CERTIFICATE OF CORRECTION

PATENT NO. : 8,152,623 B2
APPLICATION NO. : 11/628486
DATED : April 10, 2012
INVENTOR(S) : Daniel P. Fiden It is certified that error appears in the above-identified patent and that said Letters Patent is hereby corrected as shown below:

Claim 14, Column 11, Line 11
Replace "by of the payline of the first display location;" with "by the payline of the first display location,"

Signed and Sealed this
Seventeenth Day of July, 2012

David J. Kappos
*Director of the United States Patent and Trademark Office*